April 10, 1951
A. F. SCHWENDNER
2,548,072
HYDRAULIC GOVERNOR RESPONSIVE
TO RATE OF CHANGE OF SPEED
Filed Oct. 20, 1949
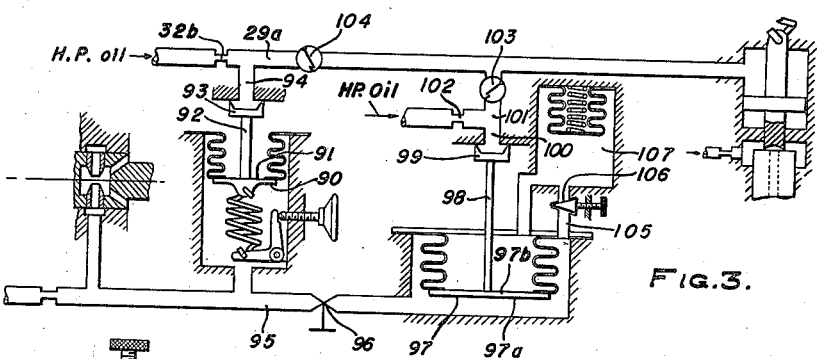
FIG.3.
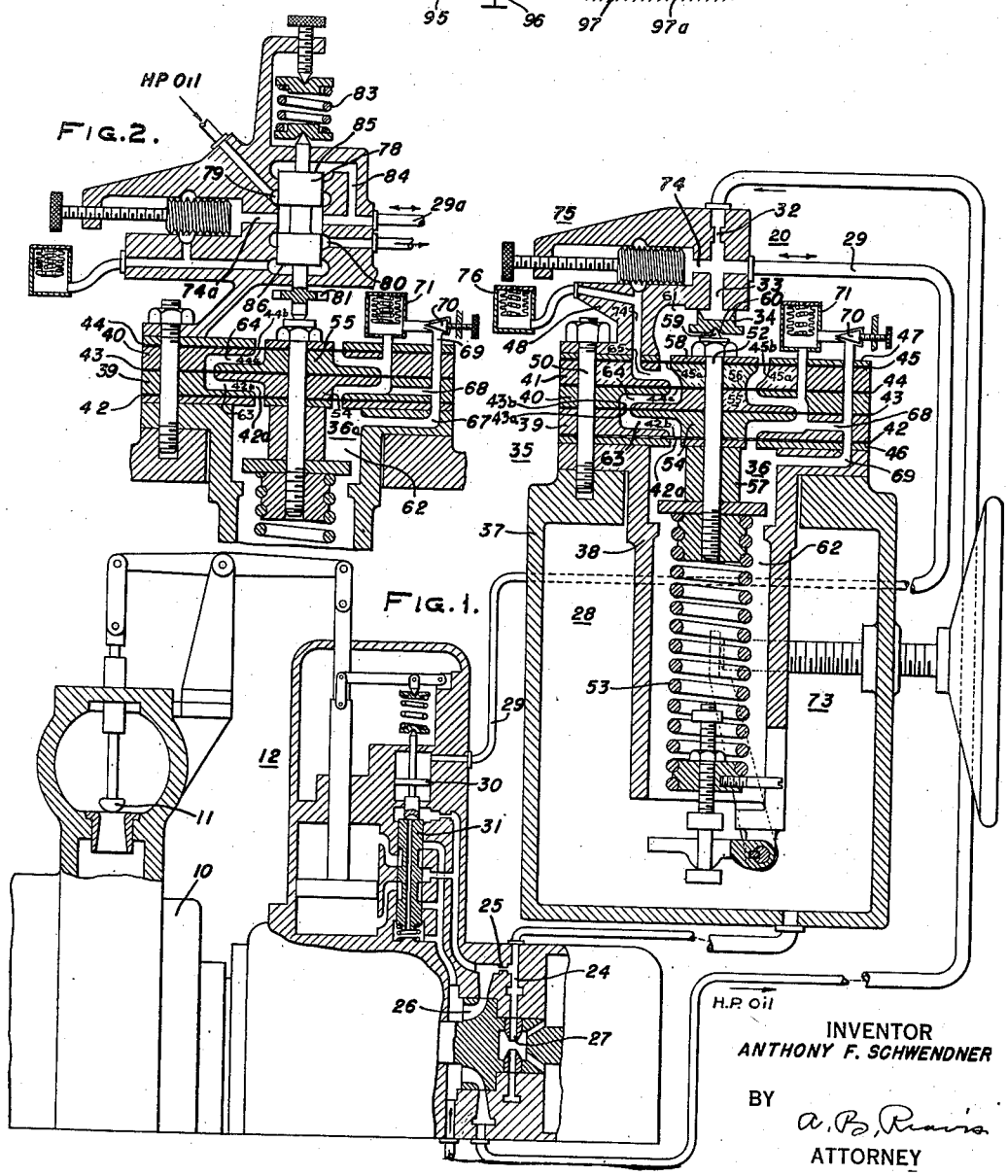
INVENTOR
ANTHONY F. SCHWENDNER
BY
ATTORNEY Patented Apr. 10, 1951

2,548,072

UNITED STATES PATENT OFFICE 2,548,072

HYDRAULIC GOVERNOR RESPONSIVE TO RATE OF CHANGE OF SPEED

Anthony F. Schwendner, Ridley Park, Pa., assignor to Westinghouse Electric Corporation, East Pittsburgh, Pa., a corporation of Pennsylvania Application October 20, 1949, Serial No. 122,399

3 Claims. (Cl. 264—7)

1

The invention relates to a governor or regulator for a prime mover and it has for an object to provide improved means of this character responsive to acceleration, and preferably also to deceleration, to limit the speed change incident to sudden load change.

Some power plant applications involve widely varying and rapidly changing loads. This is true where the turbine carries a load such as a steel mill. Since a change in load is accompanied by change in speed, if rate of change of speed, that is, acceleration, is used as a factor of control, the admission valve may be rapidly moved just as soon as the speed starts to limit the change in speed incident to sudden load change.

If there is a sudden drop in load, acceleration in turbine speed closes the admission valve, with the result that the speed does not increase as much as it would if the restriction were dependent on the extent of speed change. If the load is suddenly increased, deceleration comes into play to open wide the admission valve with the result that the speed does not decline as much as it would if response were to the extent of speed change. To enable said operation to be carried out, the turbine is equipped with a hydraulic governor wherein the controlling of regulating pressure is increased with increase in speed to restrict the admission of steam to the turbine. To detect or sense the rate of change of speed, there is provided an abutment having opposed and equal first and second pressure areas with the first area subject to primary or impeller pressure, the second pressure area exposed to pressure in a passage and an air bell, and a needle valve controlling the flow of liquid under primary pressure to the passage. While a change in primary or impeller pressure is effective immediately on the first area, because of the needle valve restriction, the change in pressure applied to the second area is delayed. In case of load drop, the increase in pressure applied to the first area results in a pressure differential effective to close the admission valve. On the other hand, if the load suddenly increases, instead of the pressure applied to the second area decreasing with that applied to the first area, air under compression in the bell or accumulator is effective to prolong the pressure applied to the second area, with the result that the differential is operative in the opposite direction to open fully the admission valve.

The foregoing and other objects are effected by my invention as will be apparent from the following description and claims taken in connection with the accompanying drawing, forming a part of this application, in which:

Fig. 1 is a diagrammatic view showing the improved governor applied to a steam turbine;

Fig. 2 is a detail view showing a modification of the apparatus shown in Fig. 1; and Fig. 3 is a diagrammatic view showing a further embodiment of the invention.

In the drawing, there is shown a turbine 10 having an admission valve 11 operated by a servomotor, at 12, responsive to governing or regulating pressure provided by the hydraulic governor.

A governor of the reverse flow impeller type, such as disclosed and claimed in the patents to Bryant 2,035,689, granted March 31, 1936, and to Schmidt 2,256,963, granted September 23, 1941, is preferably used. Such a governor includes a space or passage 24 supplied by an orifice 25 from a suitable source, such as the turbine driven impeller 26. Pressure in the passage 24 is varied by means of centrifugal resistance to escape of liquid afforded by the reverse flow impeller 27. The pressure in the space 24 increases with increase in speed and vice versa, the pressure varying substantially as the square of the speed.

Pressure in the space or passage 24 is applied to the transformer, at 28, operative to provide for change of secondary or regulating pressure in the space or passage 29 proportional to change in primary pressure in the passage 24.

Secondary or regulating pressure of the passage 29 is supplied for action on the relay piston 30 of the relay of the servomotor, at 12, the relay including a relay valve 31 which is caused to follow the relay piston 30, the relay piston controlling the application of fluid under pressure for this purpose, as more particularly disclosed and claimed in my Patent No. 2,224,321 granted December 10, 1940.

The transformer, at 20, includes the regulating pressure space 29, an orifice 32 for supplying liquid thereto from a suitable pressure source, an escape port 33 for the pressure space, and a cup valve 34 controlling the escape of liquid from the discharge end of the escape port to vary the regulating pressure in the space 29.

The transformer includes a housing 35 and inner movable structure 36 cooperating with the cup valve and operated in the manner to be described.

The housing includes lower casing elements 37 and 38, outer rings 39, 40 and 41 spacing outer portions of the diaphragms 42, 43, 44 and 45, annular clamping members or washers 46 and 47 engaging the outer sides of the outer diaphragms 42 and 45, the cover 48, and clamping bolts 50.

The inner movable structure includes a central stem 52 connected to the upper end of the spring 53 and carrying spacing members including inner rings 54, 55 and 56 corresponding, respectively, to the outer rings 39, 40 and 41 and spacing the inner portions of the diaphragms, and clamping annular members or washers 57 and 58. At its upper end, the stem has a conical tip 59 in thrust engagement with the conical recess 60 at the bottom side of the cup valve.

The cover 48 is provided with a portion of the regulating passage 29, with the discharge port 33, and with the supply orifice 32 and it defines an exhaust space 61 to which the exhaust port 33 discharges and within which is located the cup valve 34.

The diaphragm 42 has a lower pressure area 42a exposed to the pressure chamber 62; the pair of inner and outer rings 39 and 54 and the diaphragms 42 and 43 provide a pressure chamber 63 to which the diaphragm areas 42b and 43a are exposed; the pair of outer and inner rings 40 and 55 and the diaphragms 43 and 44 provide a pressure chamber 64 to which the diaphragm pressure areas 43b and 44a are exposed; and the pair of outer and inner rings 41 and 56 provide a pressure chamber 65 to which the diaphragm pressure area 44b and 45a are exposed.

As the internal diameter of the clamping member or washer 46 and the outer ring 39 and the external diameter of the inner clamping member or washer 57 and the inner ring 54 at opposite faces of the diaphragm 42 are respectively equal, the annular first and second pressure areas 42a and 42b are equal. Also the diaphragm 44 provides a third pressure area 44a equal to either the first or second areas. The pair of outer and inner rings 39 and 54 and the pair of outer and inner rings 40 and 55 are so shaped as to provide identical but oppositely arranged, pressure chambers 63 and 64, the fourth and fifth diaphragm pressure areas 43a and 43b being equal but larger than the first diaphragm pressure areas.

The impeller or controlling pressure passage 24 supplies liquid to the chamber 62 for action on the pressure area 42a and to move the movable structure 36 in a direction depending upon the direction of pressure change, the regulating pressure exerting force on the cup valve in opposition to the resultant of upward forces applied thereto by the movable structure 36. If the impeller pressure decreases, then, because of the cup valve force and the force of the spring 53, the movable structure moves downwardly until the decrease in impeller pressure acting on the diaphragm pressure area 42a is balanced by the decrease in regulating pressure acting on the cup valve area. If the impeller pressure increases, the contrary operation takes place.

In addition to impeller or controlling pressure being supplied to the pressure chamber 62, it is supplied from the latter through the passage 67, formed in the housing structure 35, and through branch passages 68 and 69 to the pressure chambers 63 and 64. As the branch passage 69 has a needle valve 70 and an air bell 71 communicating therewith between the needle valve and the pressure chamber 64, change in pressure in the latter is delayed in relation to sudden changes in impeller or controlling pressure.

If there is a sudden change in impeller pressure, change in pressure in the chamber 64 lags with respect to the pressure change in the chamber 63 and the resulting unbalance applies force to the movable structure 36, causing the latter to anticipate change in impeller pressure or speed, whereby the regulating pressure is caused to change in response to the rate of change of impeller pressure or speed, that is, it acts in response to acceleration or deceleration.

The lower end of the spring 53 is connected to the usual speed changer mechanism, at 73.

To reduce the regulation of the governor, there is provided speed compensator including a passage 74 connecting the regulating pressure space 29 and the pressure chamber 65, the passage containing a valve viscous orifice device or the like, at 75, operative to provide, with a change in regulating pressure in the space 29, a desired fraction of such change in the chamber 65. As an air bell 76 communicates with the passage between the viscous orifice and the chamber 65, the fractional change in pressure in the latter is delayed, with the result that, with proper choice of the diaphragm pressure areas 44b and 45a, a resultant force is applied to the movable structure 36 to bring about further change in regulating pressure to reduce the speed change due to load change.

In Fig. 2 there is shown a construction which is the same in principle as that of Fig. 1, except that, instead of the cup valve 34 and the supply orifice 32 for the regulating pressure space 29, the regulating pressure in the space 29a is provided by a spinner piston valve 78 controlling communication of pressure and exhaust ports 79 and 80 with the regulating pressure space 29a. The spinner piston has the usual spinning turbine rotor 81 for giving to the piston spinning motion to avoid static friction. An adjustable spring 83 engages the upper end of the spinner piston and the lower end of the latter has thrust engagement with the upper end of the movable structure, at 36a. The stationary and movable structures 35a and 36a of Fig. 2 are similar to those in Fig. 1, except that the top pair of outer and inner rings 41 and 56 and the top diaphragm 45 of the latter, defining the compensator chamber 65, are omitted.

In Fig. 2, a passage 84 applies regulating pressure to the top piston area 85 of the spinner piston, whereby there is produced an effect similar to the regulating pressure acting on the cup valve 34 of Fig. 1, that is, the regulating pressure acts on the valve to assure that a change in impeller or controlling pressure is accompanied by a proportional change in regulating pressure.

Speed compensation in Fig. 2 is effected in a manner similar to Fig. 1, except that the passage 74a is connected to supply the fractional pressure for action on the bottom piston area 86 of the spinner piston.

The spinner piston arrangement has the advantage of maintaining good regulation where considerable flow of oil under secondary or regulating pressure is required. Where the secondary or regulating space is supplied by an orifice, as in Fig. 1, the flow of oil under secondary or regulating pressure is limited by the capacity of the orifice. On the other hand, with the spinner piston, since the latter controls both pressure and pressure supply and exhaust ports the secondary or regulating pressure may be maintained with greater flow of oil.

In Fig. 3, as the acceleration-responsive device is separate from the main governor, the response is only to acceleration, and not deceleration, for reasons hereinafter given. Impeller pressure is applied to the pressure area 90 of the bellows head 91 connected, by a thrust rod 92, to the cup valve 93 controlling the escape of liquid from the port 94 of the secondary pressure space 29b supplied with liquid from a pressure source through the orifice 32b. A passage 95 having the shut-off valve 96 applies primary pressure for action on the lower pressure area 97a, substantially larger than the pressure area 90, of the bellows head 97 connected by a thrust rod 98 to the cup valve 99 controlling the escape of liquid through the port 100 from the space 101 supplied with liquid through the orifice 102. The space 101 is connected, through a check valve 103 to the regulating pressure space 29b and the latter has a check valve 104 which closes to prevent backflow to the port 94. Therefore, upon sudden load drop, the acceleration pressure supersedes the governor and rapidly closes the motive fluid valve.

A passage 105 supplies liquid under primary pressure for action on the bellows head upper area 97b. The passage 105 has a needle valve 106 and an air bell 107 communicates with the passage between the needle valve and the pressure area 97b.

Upon sudden drop in load, the pressure is rapidly increased in the space 101; and, upon such pressure becoming larger than the governor secondary or regulating pressure, the check valve 103 opens, allowing such higher pressure to enter the space 29b at the downstream side of the check valve 104, such higher pressure operating the servo-motor to close the governor valve and the check valve 104 closing to prevent escape through the port 94.

While I have shown the invention in several forms, it will be obvious to those skilled in the art that it is not so limited, but is susceptible of various changes and modifications without departing from the spirit thereof.

What I claim is:

1. The combination with a prime mover having a motive fluid admission valve and pressure-responsive means for controlling the valve, of a hydraulic governor comprising an impeller driven by the prime mover for developing primary liquid pressure varying as a function of prime mover speed; means providing a space for liquid under pressure supplied to the pressure-responsive means; means including a valve cooperating with said space to provide liquid under secondary pressure therein; opposed pressure areas for said last-named valve with one area subject to primary pressure and the other area subject to secondary pressure, whereby the valve is operative to vary the secondary pressure to maintain the latter in proportional relation to the primary pressure; and apparatus responsive to the rate of change of speed of the prime mover to vary the admission of motive fluid to the latter to limit the change in speed incident to sudden load change; said apparatus comprising a device having equal and opposed pressure areas responsive to differences of pressures supplied thereto to vary the pressure supplied by said space to the pressure-responsive means, means including a passage for supplying liquid under primary pressure to one of said last-named areas, a second passage including an air bell for supplying liquid under pressure to the other of said last-named areas, and a needle valve for controlling the flow of liquid from the first passage to the second passage.

2. The combination with a prime mover having a motive fluid admission valve and pressure responsive means for controlling the valve, of a hydraulic governor comprising an impeller driven by the prime mover for developing primary liquid pressure varying as a function of prime mover speed; means providing liquid under secondary pressure for operation of said pressure-responsive means and including a valve for varying such pressure; opposed pressure areas for said last-named valve with one area subject to primary pressure and the other area subject to secondary pressure, whereby the valve is operative to vary the secondary pressure to maintain the latter in proportional relation to the primary pressure; and apparatus responsive to the rate of change of speed of the prime mover to vary the secondary pressure for operation of said pressure-responsive means to vary the admission of motive fluid to the prime mover to limit the change in speed incident to sudden load change; said apparatus comprising equal and opposed pressure areas for said valve, means including a passage for supplying liquid under primary pressure to one of said last-named areas, a second passage including an air bell for supplying liquid under pressure to the other of said last-named areas, and a needle valve for controlling the flow of liquid from the first passage to the second passage.

3. The combination with a prime mover having a motive fluid admission valve and pressure-responsive means for controlling the valve, of a hydraulic governor comprising an impeller driven by the prime mover and providing primary pressure varying as a function of prime mover speed and which increases with increase in speed and vice-versa; means providing a space for liquid under secondary pressure for operation of said pressure-responsive means; means for maintaining liquid under secondary pressure in said space and including a valve member movable in response to opposed forces, in one direction, to increase the secondary pressure and, in the opposite direction, to reduce the secondary pressure; a thrust element for applying force to said valve member; a spring for exerting force on the thrust element in the direction for movement of the valve member to reduce the secondary pressure; means providing first, second, third, fourth and fifth pressure areas for the thrust element; said first, second and third pressure areas being equal with the second area opposed to the first and third pressure areas and with the third pressure area arranged so that pressure applied thereto exerts force on the thrust element in opposition to the spring and in the direction for valve member movement to increase the secondary pressure; said fourth and fifth pressure areas being equal and opposed and larger than the first, second and third pressure areas; means including a passage for applying liquid under primary pressure to the first, second and fourth pressure areas; a passage for applying liquid under pressure to the third and fifth pressure areas and including an air bell; and a needle valve for connecting said passages and effective to provide, with a sudden change in load, for differential of pressures applied to the fourth and fifth pressure areas to apply force to the valve member to vary the secondary pressure in response to the rate of change of speed to operate the pressure responsive means to limit the speed change.

ANTHONY F. SCHWENDNER.

(References on following page)

REFERENCES CITED

The following references are of record in the file of this patent:

UNITED STATES PATENTS

| Number | Name | Date |
|---|---|---|
| 2,247,434 | Bryant | July 1, 1941 |
| 2,256,963 | Schmidt | Sept. 23, 1941 |
| 2,258,136 | Folgmann | Oct. 7, 1941 |
| 2,261,462 | Gabalis | Nov. 4, 1941 |
| 2,294,975 | Gabalis | Sept. 8, 1942 |
| 2,438,662 | Greenland | Mar. 30, 1948 |